United States Patent
Zeller

(10) Patent No.: US 8,932,381 B2
(45) Date of Patent: Jan. 13, 2015

(54) SINTERED POROUS MATERIAL COMPRISING PARTICLES OF DIFFERENT AVERAGE SIZES

(75) Inventor: Robert S. Zeller, Boston, MA (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 13/375,844

(22) PCT Filed: Jun. 16, 2010

(86) PCT No.: PCT/US2010/038763
§ 371 (c)(1),
(2), (4) Date: Dec. 2, 2011

(87) PCT Pub. No.: WO2010/148051
PCT Pub. Date: Dec. 23, 2010

(65) Prior Publication Data
US 2012/0079940 A1    Apr. 5, 2012

Related U.S. Application Data

(60) Provisional application No. 61/218,310, filed on Jun. 18, 2009.

(51) Int. Cl.
*B01D 39/20* (2006.01)
*B01D 39/00* (2006.01)
(Continued)

(52) U.S. Cl.
CPC .......... *B01D 71/022* (2013.01); *B01D 67/0041* (2013.01); *B22F 1/0014* (2013.01);
(Continued)

(58) Field of Classification Search
CPC  C04B 38/0006; C04B 38/0009; B01D 69/00;
B01D 2046/2496; B01D 39/14; B01D 69/06;
B01D 2239/1241; B01D 2239/125; B01D 2325/24; B01D 2325/02; B01D 71/022;
B01D 2325/04; B01D 67/0041; F01N 3/0222;
F01N 2330/06; B22F 2999/00; B22F 1/0014;
B22F 3/1103
USPC .......................... 96/4; 55/522–524; 428/304.4
See application file for complete search history.

(56) References Cited

U.S. PATENT DOCUMENTS

| | | | |
|---|---|---|---|
| 4,186,100 | A | 1/1980 | Mott |
| 5,114,447 | A | 5/1992 | Davis |

(Continued)

FOREIGN PATENT DOCUMENTS

| | | |
|---|---|---|
| EP | 1361010 | 11/2003 |
| JP | 57-169002 A | 10/1982 |

(Continued)

OTHER PUBLICATIONS

International Preliminary Report on Patentability from counterpart International Application No. PCT/US2010/038763, Dated: Jan. 5, 2012.

(Continued)

*Primary Examiner* — Amber Orlando
(74) *Attorney, Agent, or Firm* — Hamilton, Brook, Smith & Reynolds, P.C.

(57) ABSTRACT

A porous membrane, comprising a blend of a first powder of metal particles of the first average size and a second powder of metal particles of a second average size, the first powder and the second powder sintered together. The first average size is five to fifty times greater than the second average size. The porous membrane comprises from 40% to 60% by weight of the first powder.

27 Claims, 9 Drawing Sheets

(51) Int. Cl.

| | |
|---|---|
| *B01D 39/06* | (2006.01) |
| *B01D 24/00* | (2006.01) |
| *B01D 39/14* | (2006.01) |
| *B01D 53/22* | (2006.01) |
| *B01D 59/12* | (2006.01) |
| *B32B 3/26* | (2006.01) |
| *B01D 71/02* | (2006.01) |
| *B01D 67/00* | (2006.01) |
| *B22F 1/00* | (2006.01) |
| *B22F 3/11* | (2006.01) |

(52) U.S. Cl.
CPC ........... *B22F3/1103* (2013.01); *B22F 2999/00* (2013.01); *B01D 2325/02* (2013.01); *B01D 2325/04* (2013.01); *B01D 2325/24* (2013.01)
USPC ...... 55/523; 96/4; 55/522; 55/524; 428/304.4

(56) References Cited

U.S. PATENT DOCUMENTS

| | | | | |
|---|---|---|---|---|
| 5,364,586 | A | * | 11/1994 | Trusov et al. .................. 419/2 |
| 5,468,273 | A | * | 11/1995 | Pevzner et al. ................ 55/523 |
| 5,487,771 | A | * | 1/1996 | Zeller ............................ 55/523 |
| 5,814,272 | A | * | 9/1998 | Zeller et al. .................... 419/26 |
| 5,908,662 | A | | 6/1999 | Fu |
| RE36,249 | E | * | 7/1999 | Zeller ............................ 55/523 |
| 5,993,502 | A | * | 11/1999 | Motoki et al. ................. 55/487 |
| 6,193,778 | B1 | * | 2/2001 | Zeller et al. .................... 75/245 |
| 7,112,237 | B2 | * | 9/2006 | Zeller et al. .................... 95/273 |
| 7,524,361 | B2 | | 4/2009 | Park et al. |
| 7,744,675 | B2 | * | 6/2010 | Saukaitis et al. ................ 95/55 |
| 8,007,573 | B2 | * | 8/2011 | Bansal et al. ........................ 96/4 |
| 8,048,199 | B2 | * | 11/2011 | Saukaitis ........................ 95/55 |
| 2004/0137209 | A1 | | 7/2004 | Zeller et al. |
| 2006/0236668 | A1 | * | 10/2006 | Stobbe et al. .................. 55/523 |
| 2007/0071631 | A1 | * | 3/2007 | Laschutza et al. .............. 419/23 |
| 2007/0131428 | A1 | * | 6/2007 | Willem Cornelis den Boestert et al. ............................. 166/302 |
| 2007/0157811 | A1 | * | 7/2007 | Park et al. ........................... 96/4 |
| 2009/0120293 | A1 | * | 5/2009 | Saukaitis ......................... 96/11 |

FOREIGN PATENT DOCUMENTS

| | | |
|---|---|---|
| JP | 05-287328 | 11/1993 |
| JP | 2002-266003 A | 9/2002 |
| WO | WO 90-15661 A1 | 12/1990 |

OTHER PUBLICATIONS

Extended European Search Report dated Sep. 20, 2013 for European Application No. 10790093.8 filed Jun. 16, 2010, entitled "Sintered Porous Material Comprising Particles of Different Average Sizes".
Notification of Transmittal of the International Search Report and the Written Opinion of the International Searching Authority, or the Declaration PCT/US2010/038763, Date of Mailing: Feb. 25, 2011, 10 pp.

* cited by examiner

SINTERED POROUS MATERIAL COMPRISING PARTICLES OF DIFFERENT AVERAGE SIZES

RELATED APPLICATION

This application is the U.S. National Stage of International Application No. PCT/US2010/038763, filed Jun. 16, 2010, which designates the U.S., published in English, and claims the benefit of U.S. Provisional Application No. 61/218,310, filed Jun. 18, 2009. The entire teachings of the above applications are incorporated herein by reference.

BACKGROUND OF THE INVENTION

The speed of wafer process is often gated by the "vent up" and "vent down" time spent in the loadlock of a processing tool. This speed was greatly increased in the 1990's with the introduction of load lock diffusers (porous membranes) which allowed fast venting of chambers without creating turbulent gas patterns which might disturb particles thus contaminating the work. Examples of these diffusers include the Entegris ChamberGard™ (available from Entegris, Chaska, Minn.) line of products based on Nickel membrane. Due to the nature of this membrane, the diffusers also act as particle filters, offering 3 nanometer filtration with up to 9 Log Reduction Value (LRV) (i.e., removal of 99.9999999% of contaminants).

ChamberGard™ flat sheet diffuser (membrane), known as FV-50, is designed for a maximum operating pressure of 45 psid. At this pressure, it has a warranted lifetime of 100,000 cycles. Higher numbers of cycles would be beneficial for today's single wafer tools. The FV-50 is a product made by the sintering of a 2-micron nickel powder into sheets that are 0.100 inches thick and 65% porous. The material provides an LRV value of 9 down to the particle size of 3 nanometers. The material is ideally suited as a diffuser (membrane) with the fine pore structure diffusing the gas uniformly over the surface.

In recent years, and particularly with single wafer processing, there is a need to further increase the vent speed of loadlock chambers. Many end users have increased the inert gas supply pressure to the chamber diffusers to increase the flow rate and reduce the vent time. As a consequence, the number of lifecycles has also increased dramatically. The loadlock diffuser/filters are being subjected to higher pressures and more cycles then they were designed to handle.

Current metal diffusers (membranes) also act as high efficiency filters. These filters are high surface area and high porosity bodies made by the sintering of fine metal particles (not more than 10 micron in average size). These materials, while strong and robust when compared to polymeric materials, have their limitations. This is particularly the case when dealing with flat sheets. Because single wafer chambers are by design very shallow to minimize volume, the use of a flat sheet diffuser (membrane) has been shown to be vastly superior than tubular elements, providing a much smoother gas flow while taking up less chamber volume.

There exists a need for a filter/diffuser that can be produced in a form of a flat sheet, can withstand high gas pressures over several million cycles without creating gas turbulence in the chamber, all while offering high efficiency particulate filtration.

SUMMARY OF THE INVENTION

In one embodiment, the present invention is a porous membrane comprising a blend of a first powder of metal particles of a first average size and a second powder of metal particles of a second average size, the first powder and the second powder sintered together. The first average size is five to fifty times greater than the second average size, and the porous membrane comprises from 40% to 60% by weight of the first powder.

In another embodiment, the present invention is a gas diffuser device comprising a housing having an inlet and an outlet, and a porous membrane disposed within the housing in fluid communication with the inlet and the outlet. The porous membrane comprises a blend of a first powder of metal particles of a first average size and a second powder of metal particles of a second average size, the first powder and the second powder sintered together. The first average size is five to fifty times greater than the second average size, and the porous membrane comprises from 40% to 60% by weight of the first powder.

In another embodiment, the present invention is a gas diffuser device comprising a housing having an inlet and an outlet; and a porous membrane disposed within the housing in fluid communication with the inlet and the outlet. The porous membrane is a flat sheet having a thickness from 0.2 cm to 0.5 cm, having Log Reduction Value of at least 6 in a gas for 0.1 micron particles and velocity of 3 slpm/cm$^2$, and a burst pressure of at least 300 pounds per square inch. The porous membrane comprises a blend of a first powder of metal particles of a first average size and a second powder of metal particles of a second average size, the first powder and the second powder sintered together, wherein the first average size is five to fifty times greater than the second average size, and the porous membrane comprises from 40% to 60% by weight of the first powder.

In another embodiment, the present invention is a method of purifying a gas stream. The method comprises directing a gas stream through a porous membrane. The porous membrane comprises a blend of a first powder of metal particles of a first average size and a second powder of metal particles of a second average size, the first powder and the second powder sintered together. The first average size is five to fifty times greater than the second average size, and the porous membrane comprises from 40% to 60% by weight of the first powder.

The porous membranes advantageously possess higher burst strength than the materials previously employed for gas stream purification, while retaining high throughput and filtration efficiency.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Glossary

Figure 1:
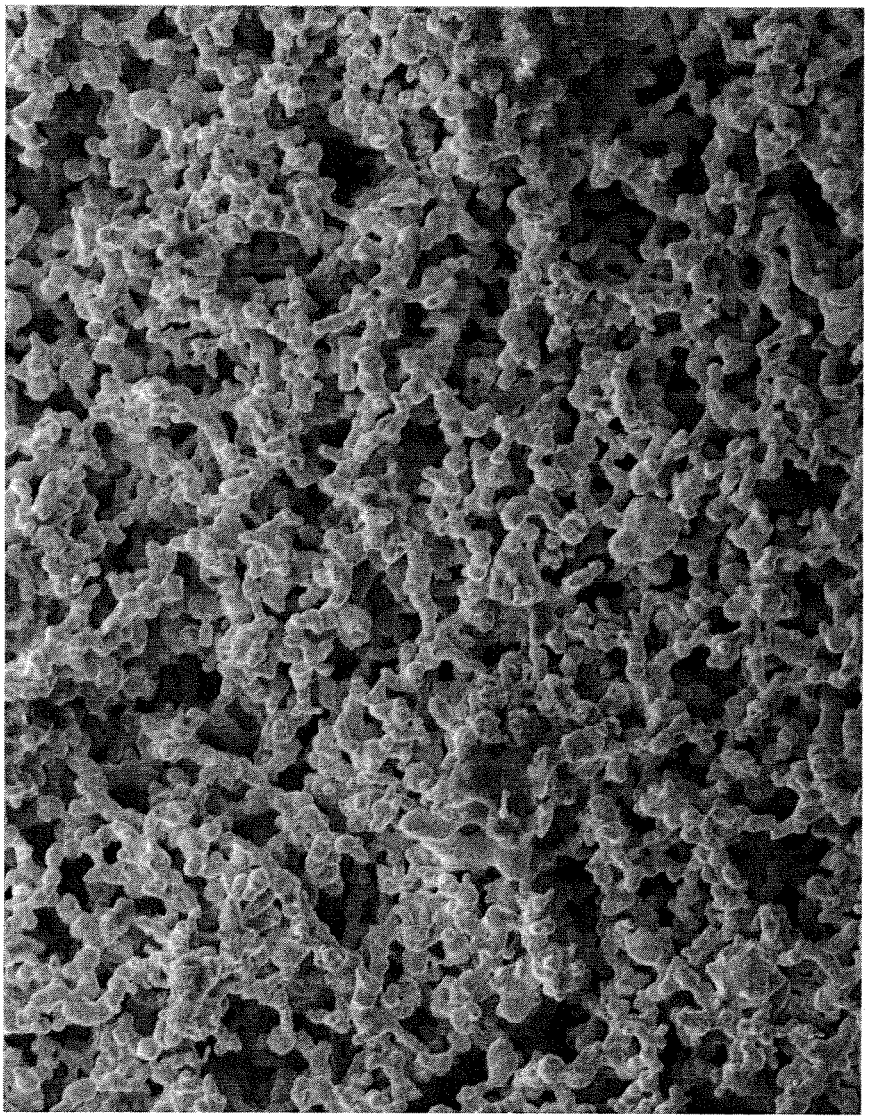
FIG. 1 is a scanning electron microphotograph (SEM, 2000× magnification) showing a porous membrane of prior art.

While various compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

As used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Methods and materials similar or equivalent to those described herein can be used in the practice or testing of embodiments of the present invention. All publications mentioned herein are incorporated by reference. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values are herein can be modified by the term "about" or "substantially" whether or not explicitly indicated. The term "about" or "substantially" generally refers to a range of numbers that one of skill in the art would consider equivalent to the recited value (i.e., having the same function or result). In some embodiments the term "about" or "substantially" refers to ±10% of the stated value, in other embodiments the term "about" or "substantially" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

As used herein, the term "LRV" refers to "log reduction value," which is a measure of filtration efficiency under specified flow rate (or gas velocity), for a specified particle size and material thickness. An LRV value of 1 means that 90% of contaminants are retained by the filter. LRV of 2 means that 99% of contaminants are retained by the filter, LRV of 3 means that 99.9% of the contaminants are retained by the filter, etc. Any value of flow rate (gas velocity), particle size and material thickness can be selected to measure LRV of a porous membrane of the present invention. One of ordinary skill in the art would understand that specific values are a matter of convenience, experimental setup and/or intended use. For example, in one embodiment, LRV can be measured at velocity of about 3 splm/cm$^2$, for a particles having an average size of 100 nm and the material thickness of about 0.4 cm (e.g., 0.44 cm). Alternatively, LRV can be measured at velocity of about 3 splm/cm$^2$, for a particles having an average size of 10 nm and the material thickness of about 0.4 cm (e.g. 0.44 cm). Alternatively, LRV can be measured at velocity of about 3 splm/cm$^2$, for a particles having an average size of 3 nm and the material thickness of about 0.4 cm (e.g. 0.44 cm).

As used herein, a "strength" of a material of a filter (e.g. of a porous membrane) refers to the gas pressure at which the material will burst when the membrane is configured into disk that is welded at the circumference in the manner of a fixed flat plate. A typical pressure at which the strength is measured is 300 psi.

As used herein, the term "throughput" refers to a flow rate through a filter of a fixed cross-section at a fixed pressure.

As used herein, the total internal surface of a unit of material is a value measured by the Brunauer-Emmett-Teller (BET) method. In summary, the BET method can be used to calculate surface areas of solids by physical adsorption of gas molecules. One of ordinary skill in the art or physics of surface would be able to employ the BET method for measuring the total internal surface of porous membranes of the present invention without undue experimentation.

As used herein, the term "bubble point" refers to a value of pressure obtained by a bubble point pressure test. The bubble point pressure test measures the pressure necessary to force a gas (e.g., air) through the pores of a porous membrane previously wetted with a liquid. The liquid can be water, isopropyl alcohol (IPA), methanol, ethanol, or any other suitable liquid.

As used herein, 1 pound per square inch equals 6,894.8 Pa. 100 kPa is equal to 1 bar.

As used herein, "slpm" is a unit of flow, Standard Liters per Minute, as measured using the flow of nitrogen gas at 0° C. and 1.01 bar of pressure.

Porous Membranes of the Invention

A material has been developed which incorporates the fine pore structure with high strength and long lifecycle capability. This is accomplished by the blending of at lest one fine powder metal particles with at least one coarse metal powder metal particles, followed by sintering the blend together. This material, when incorporated into, for example an existing diffuser (membrane) design such as but not limited to the FV-50, manufactured by Entegris, Inc., is capable of handling pressures up to 75 pounds per square inch differential pressure (psi differential or "psid") and lifecycles of greater that 1,000,000 while offering up to 6 log particle reduction for 0.003 micron particles in a gas. In addition, the sintered membrane retains the flow profile of a sintered porous membrane made using fine nickel powders alone.

Accordingly, in various embodiments, the invention comprises flat sheet membranes of a blend of at least one fine metal powder and at least coarse metal powder, each comprising metal particles, sintered together. The fine and coarse particles have different average sizes which can differ by a factor of about 5 to about 50, in some embodiments the fine and coarse particles have different average sizes which can differ by a factor of 50 or more.

In one embodiment, the present invention is a porous membrane comprising a blend of a first powder of metal particles of the first average size and a second powder of metal particles of a second average size, the first powder and the second powder sintered together. In certain embodiments additional powders (a third, a fourth, etc.) can be used.

Preferably, the first average size is five to fifty times greater than the second average size. In some embodiments, the porous membrane comprises from 40% to 60% by weight of the first powder, preferably, the porosity of the porous membrane is from 37% by volume to 50% by volume, more preferably, the porosity of the porous membrane is from 42% by volume to 48% by volume.

In certain embodiments, the first average size is from about 40 microns to about 60 microns, and the second average size is not greater than about 2 microns, preferably, the first average size is about 50 microns, and the second average size is about 2 microns.

The metal particles of the powders used in the porous membranes of the present invention can include particles of any sinterable metal suitable for the required application, as will be further described below. For examples, metals can be selected from iron, chromium, nickel, alloys containing nickel and steel. Alternatively, metal can be a refractory metal such as niobium or molybdenum, a precious metal such as gold or silver, or a superalloy such as Inconel® (a line of nickel-chromium alloys available from Special Metals Corporation, New York, U.S.A.,) or Hastalloy® (a line of nickel-based alloys available from Haynes International Inc., Indiana, USA). Preferably, the metal particles of the first powder and the metal particles of the second powder are each independently selected from nickel or stainless steel. In some embodiments, the metal particles of the first powder and the metal particles of the second powder are each selected from nickel.

In exemplary embodiments, the porous membrane of the present invention exhibits a Log Reduction Value (LRV) from 4 to 6 for 0.1 micron particles, gas velocity of 3 slpm/cm$^2$ and 0.4 centimeter thick membrane. Preferably, the porous membrane has a Log Reduction Value (LRV) is 6 or more for 0.1 micron particles, gas velocity of 3 slpm/cm$^2$ and 0.4 centimeter thick membrane. Alternatively, the porous membrane of the present invention exhibits a Log Reduction Value (LRV) from 4 to 6 for 0.003 micron particles, gas velocity of 3 slpm/cm$^2$ and 0.4 centimeter thick membrane. Preferably, the porous membrane has a Log Reduction Value (LRV) that is 6 or more for 0.003 micron particles, gas velocity of 3 slpm/cm$^2$ and 0.4 centimeter thick membrane.

In exemplary embodiments, the porous membrane of the present invention exhibits the water bubble point from 4 to 8 psi.

One embodiment of the invention is a porous diffuser (membrane) comprising a blend of about 40 wt. % to about 60 wt, % of a first set of metal particles having one average size and a second set of metal particles making up the balance of the diffuser (membrane) having a second average size smaller than the first set of metal particles. The fist set of metal particles are sintered together and the second set of metal particles sintered to each other and are sintered with the first set of metal particles. The diffuser (membrane) has a porosity in the range of about 37% by volume to about 50% by volume and pores of the diffuser (membrane) are distributed throughout the diffuser (membrane) body. The diffuser (membrane) has an LRV of 4 to an LRV of 6 for 0.1 micron particles and gas velocity of 3 slpm/cm$^2$. The membrane can have a thickness from 0.2 cm to 0.5 cm. For example, the membrane can be about 0.4 centimeter thick diffuser. The membrane (diffuser) can have any diameter. For example, the membrane can have a diameter of 5.2 centimeters. The diffuser (membrane) has a burst pressure of at least 300 pounds per square inch (psi), preferably greater than 350 psi. Alternatively, LRV is measured under the same conditions except for particles having the average size of 0.003 micron.

In some embodiments of the invention the first set of coarse metal particles has an average size of about 40 microns to about 60 microns, and said second set of metal particles has an average size of about 2 microns or less. In some versions the second set of metal particles has an average size of about 2 microns.

The diffuser (membrane) in versions of the invention can have a porosity between about 42 vol % and about 48 vol % and an LRV of 6 or more for 0.1 micron particles in a gas. Alternatively, the diffuser (membrane) in versions of the invention can have a porosity between about 42 vol % and about 48 vol % and an LRV of 6 or more for 0.003 micron particles in a gas.

The diffuser (membrane) remains integral after 1 million pressure cycles of 75 psid, where the pressure cycles have a duration of about 2 seconds.

In one version of the invention, the first set of metal particles is nickel with a size of about 50 microns and the second set of metal particles is nickel with a size of 2 microns. A 0.44 centimeter thick diffuser (membrane) made from these particles as a flat sheet with a diameter of 5 cm centimeters can be characterized by an LRV of at least 6 in a gas for 0.1 micron particles, the diffuser (membrane) has a water bubble point of between 4 and 8 pounds per square inch, a nitrogen gas flow per unit area (at 18 pounds per square inch pressure inlet) of 5 slpm/cm$^2$ and a burst pressure of greater than 350 psi. Alternatively, LRV is measured under the same conditions except for particles having the average size of 0.003 micron.

Sinterable powders of two different sizes, in some versions more than two sizes, can be blended together in versions of the invention. The sinterable powders in some versions of the invention can include corrosion resistant materials such as but not limited to nickel, those alloys containing nickel, alloys like stainless steel, and the like such as disclosed in U.S. Pat. No. 5,487,771, incorporated herein by reference in its entirety. In some versions the metal particles are nickel. The size of the small metal particle powders in the blend are chosen to provide the surface area for gas particle reduction of about 9 LRV or higher for 0.003 micron test particles under standard particle reduction conditions (for example test conditions for an Entegris FV-50 filter) for a sintered filter made of only the small particles. The size of the large or coarse metal particles can be chosen so that when mixed with the smaller particles they can be pressed into a coherent green compact (i.e. an unsintered compacted powder) at pressures between 800 pounds per square inch and 1500 pounds per square inch. The coarse particles can have a size that when mixed with the small particles in an amount of 40% by weight to 60% by weight provides a porous sintered membrane with porosity in the range of 40% by volume to 60% by volume and a pressure drop that is within about ±20% of the pressure drop for a filter made with the small particles alone. In some versions of the invention the coarse particles can have a size that when mixed with the small particles in an amount of 40% by weight to 60% by weight provides a porous sintered membrane with porosity in the range of 40% by volume to 60% by volume and a pressure drop that is within about ±10% of the pressure drop for a filter made with the small particles alone.

Small or fine particles that can be sintered have a size of 10 micron or less. Coarse or large particles that can be sintered can have a size of 10 microns or more.

The porous sintered membrane compositions in versions of the invention have an LRV which is not dependent, or weakly dependent, on overall porosity and percent blend of powders. Rather, in order to maximize LRV, the thickness of the material is increased.

Figure 2:
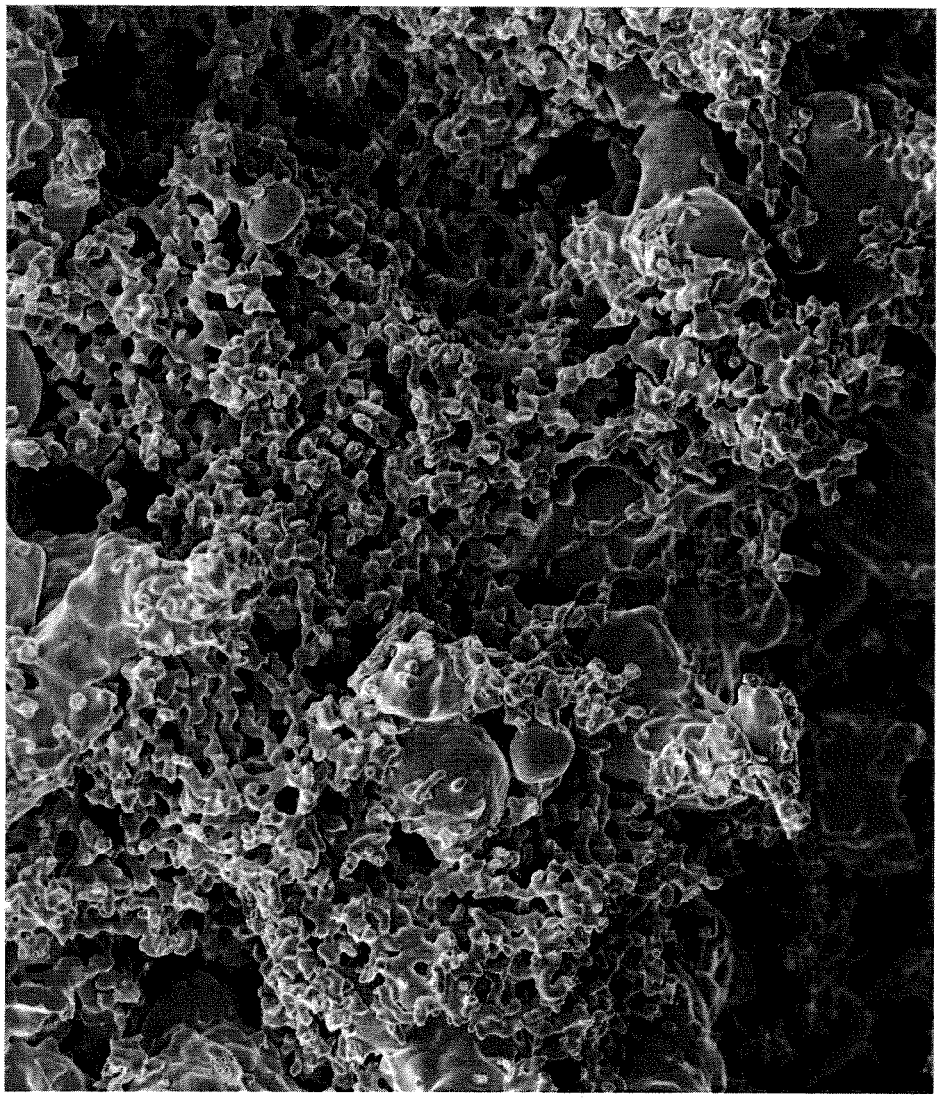
FIG. 2 and FIG. 3 are each an SEM (1000× magnification for FIG. 2, 200× magnification for FIG. 3) of a porous membranes of the present invention comprising a first powder of nickel particles having an average size of 50 microns and a second powder of nickel particles having an average size of 2 microns.
Figure 3:

The appearance of the porous membranes of the present invention can be further understood with reference to FIG. 1, FIG. 2 and FIG. 3. FIG. 1 is a SEM microphotograph showing a porous membrane of prior art, comprising a powder of monodispersed (single-size) metal particles sintered together. FIG. 2 and FIG. 3 are each an SEM microphotograph (at different magnification) of a porous membranes of the present invention comprising a first powder of nickel particles having an average size of 50 microns and a second powder of nickel particles having an average size of 2 microns.

Gas Diffuser Devices Comprising Porous Membranes

Figure 4:
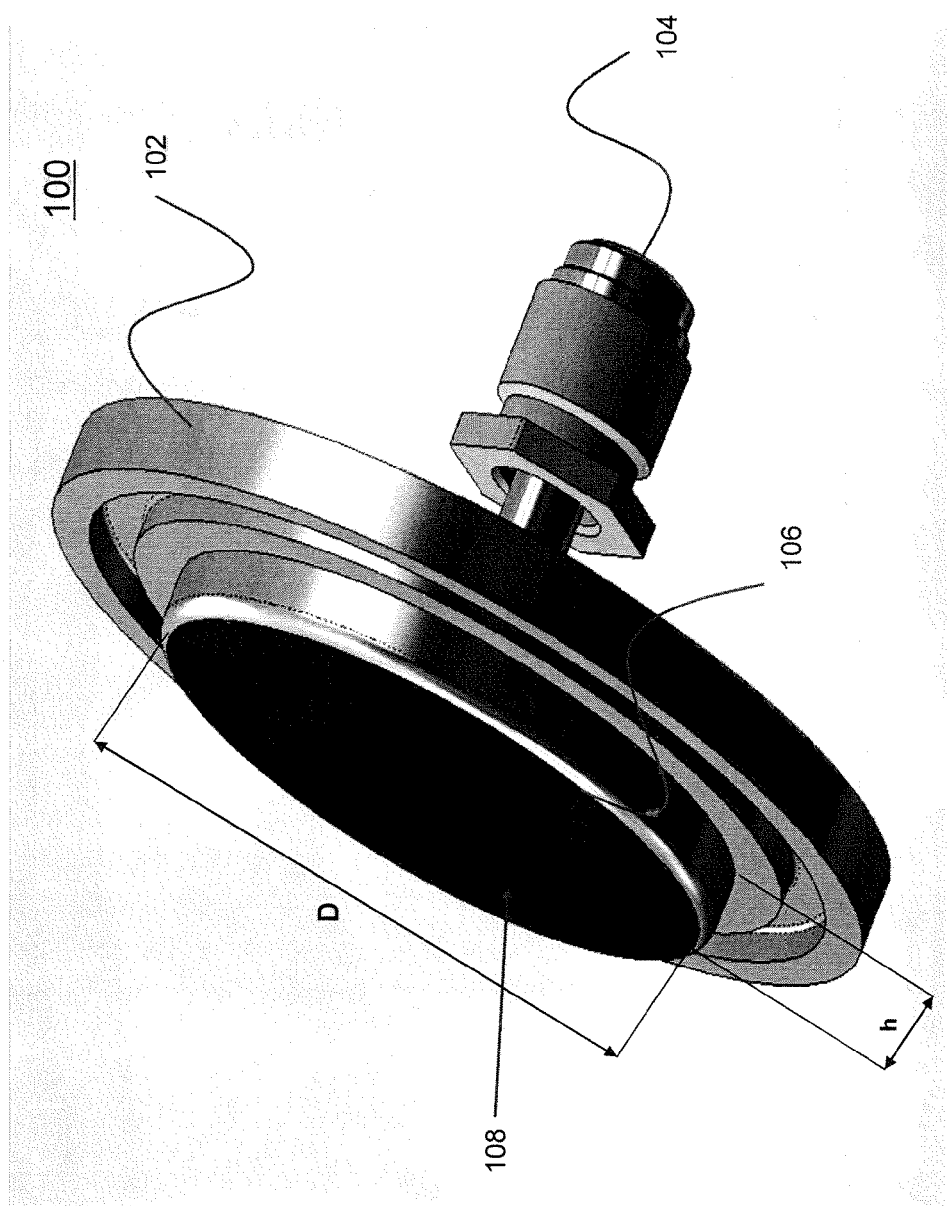
FIG. 4 is a schematic diagram of an exemplary embodiment of a device of the present invention.

Referring to FIG. 4, in one embodiment, the present invention is a gas diffuser device 100, comprising housing 102, having inlet 104 and outlet 106. A porous membrane of the present invention 108 is disposed within housing 102 in fluid communication with inlet 104 and outlet 106. Any of the porous membranes described herein can be employed in device 100.

In exemplary embodiments, device 100 comprises porous membrane 108 manufactured as a flat sheet having a thickness of 0.1 inch or more. In one embodiment, device 100 comprises porous membrane 108 manufactured as a flat sheet having a thickness (h) of from about 0.2 cm to about 0.5 cm. For example, membrane 108 can have a thickness of about 0.40 cm or 0.44 cm. Membrane 108 can have any diameter. For example, membrane 108 can have and a diameter (D) of 5.2 centimeters. In further embodiments, the Log Reduction Value of the porous membrane is at least 6 in a gas for 0.1 micron particles. Alternatively, LRV is measured under the same conditions except for particles having the average size of 0.003 micron. In exemplary embodiments, the porous membrane of the gas diffuser device 100 exhibits a burst pressure of at least 300 pounds per square inch (psi), preferably, greater than 350 psi.

Methods of the Invention

In one embodiment, the present invention is a method of purifying a gas stream. The method comprises directing a gas stream through a porous membrane of the present invention. Any of the porous membranes described herein can be employed. In one embodiment, device 100 shown in FIG. 4 can be employed to purify a gas stream.

The LRV of the porous membranes of the present invention increases with growing thickness of the final sintered porous membrane. The porosity and the composition of the starting powder can be modified to tailor the sintered porous membrane for a desired pressure drop.

In the experiments described below, the porous membranes of the present invention were prepared using, as a starting material, a blend of Vale Inco Type 255 nickel powder (2 micron filamentary nickel powder available from Novamet Specialty Products, New Jersey, USA), and a "coarse" 50 micron Ametek® 200 nickel powder is a nickel powder available from Ametek® Specialty Metal Product Division, Pennsylvania, USA. It is noted that Vale Inca Type 255 nickel powder is used in manufacturing Entegris WaferGuard® NF line of porous membranes. NF membrane is manufactured by sintering Vale Inco Type 255 powder.

Example 1

Preparation of Samples

A number of membranes containing fine powder and coarse powder were made with proportions as show in the Table 1 below.

TABLE 1

| Disk # | % Desired Porosity | % Coarse Powder |
| --- | --- | --- |
| 1 | 40.00 | 40.00 |
| 2 | 50.00 | 50.00 |
| 3 | 60.00 | 60.00 |
| 4 | 40.00 | 60.00 |
| 5 | 50.00 | 40.00 |
| 6 | 60.00 | 50.00 |
| 7 | 40.00 | 50.00 |
| 8 | 50.00 | 60.00 |
| 9 | 60.00 | 40.00 |

A 2.9 inch mold was used to make the green form disks using the force (in pounds) and percentage of coarse powder given in the Table 2 below. The thickness of the green form in centimeters was estimated. The mass of coarse Ni powder in grams and the mass of the fine Vale Inco Type 255, 2 micron powder in grams are also given:

TABLE 2

| Disk # | % Desired Porosity | % Coarse Powder | Mass Required | Mass Coarse-g | Mass 255-g | Estimated Mold t-cm | Press (pounds) |
| --- | --- | --- | --- | --- | --- | --- | --- |
| 1 | 40.00 | 40.00 | 52.4 | 21.0 | 31.4 | 1.000 | 15,000 |
| 2 | 50.00 | 50.00 | 43.0 | 21.5 | 21.5 | 0.723 | 10,000 |
| 3 | 60.00 | 60.00 | 33.4 | 20.0 | 13.4 | 0.488 | 4,000 |
| 4 | 40.00 | 60.00 | 52.4 | 31.4 | 21.0 | 0.767 | 14,000 |
| 5 | 50.00 | 40.00 | 43.0 | 17.0 | 26.0 | 0.819 | 10,000 |
| 6 | 60.00 | 50.00 | 33.4 | 16.7 | 16.7 | 0.563 | 5,000 |
| 7 | 40.00 | 50.00 | 52.4 | 26.2 | 26.3 | 0.884 | 15,000 |
| 8 | 50.00 | 60.00 | 43.0 | 26.0 | 17.0 | 0.628 | 12,000 |
| 9 | 60.00 | 40.00 | 33.4 | 13.4 | 20.0 | 0.637 | 5,000 |

EXEMPLIFICATION

Porous membranes of the present invention were prepared using methods described herein. LRV values of the porous membranes of the present invention are independent of the overall porosity and composition of the starting particle powders. No measurable relationship between LRV and the starting powder composition and membrane porosity was found.

All disks were sintered at 1050° C. in hydrogen gas for 1 hour.

Sintering at 1050° C. will result in a greater sinter bonding in the Vale Inco Type 255 powder than sintering at a lower temperature. Sintering at temperatures above 1050° C. can lead to loss of surface area with a subsequent drop in LRV values for the porous membranes of the present invention.

Porosities ranged from about 37 to 51%. Previous experimentation had shown that sintering at temperatures lower than 1050° C. resulted in significant loss of porous sintered membrane strength.

The final cut disks (47 mm) had the characteristics listed in Table 3. (In Table 3, mass is in grams (g), "Od" is outside diameter of disk in centimeters (cm), "t" is the thickness of the disk in centimeters (cm), ρ is the density of the disk in grams/cubic centimeter (g/cc), Po is the porosity in percent, and ID refers to the overall porosity and percent of coarse powder. For example "37/40" refers to 37% overall porosity and 40% by weight of 50 micron powder.)

TABLE 3

| Disk # | Mass-g | Od-cm | t-cm | v-cc | ρ-g/cc | % Po | ID |
|---|---|---|---|---|---|---|---|
| 1 | 27.90 | 4.740 | 0.285 | 5.028 | 5.548744 | 37.51 | 37/40 |
| 2 | 18.26 | 4.740 | 0.220 | 3.881 | 4.704500 | 47.02 | 47/50 |
| 3 | 19.35 | 4.740 | 0.250 | 4.411 | 4.387088 | 50.60 | 50/60 |
| 4 | 28.10 | 4.730 | 0.310 | 5.446 | 5.159581 | 41.90 | 42/60 |
| 5 | 19.90 | 4.740 | 0.220 | 3.881 | 5.127029 | 42.26 | 42/40 |
| 6 | 19.10 | 4.740 | 0.235 | 4.146 | 4.606816 | 48.12 | 48/50 |
| 7 | 27.47 | 4.740 | 0.285 | 5.028 | 5.463226 | 38.48 | 38/50 |
| 8 | 21.70 | 4.740 | 0.240 | 4.234 | 5.124882 | 42.29 | 42/60 |
| 9 | 17.20 | 4.735 | 0.200 | 3.521 | 4.884842 | 44.99 | 45/40 |

Since thickness varied and post-sintering pressing would skew the results, all measured values were adjusted to a standard thickness of 2.54 mm. One of ordinary kill in the art would appreciate that, although the thickness of the membranes in this example varied from about 0.2 cm to about 0.31 cm, a different thickness can be chosen based on convenience, intended application and desired result. For example, the thickness of a membrane can be chosen from a range of about 0.2 cm to about 0.5 cm. In one example, the thickness can take any of the values listed in Table 3. In another example, the thickness can be 0.4 cm. In yet another example, the thickness can be 0.44 cm.

Example 2

Measurements of the Pressure Drop

Figure 5:
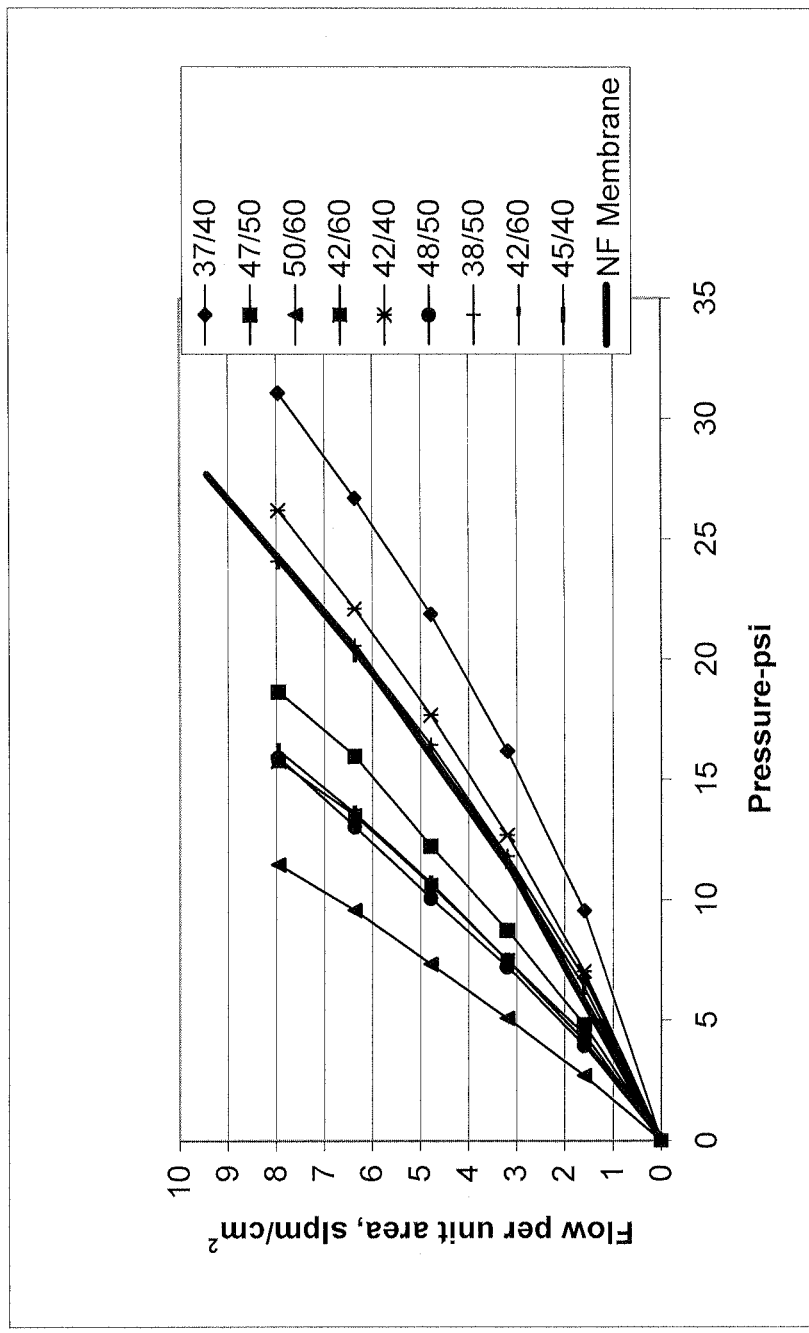
FIG. 5 is a plot of a pressure drop (T adjusted) as a function of pressure across different porous membranes of the present invention.

Pressure drops generated by the porous membranes listed in Table 3 (identified by "ID") were measured and the results are shown in FIG. 5. In FIG. 5, the Y-axis is the flow (q)/area (a) (units are liters per minute/centimeters squared), 1.5 while the X-axis is pressure (in pounds per square inch). The pressure drop was adjusted to a standard thickness of 2.54 millimeters. "NF Membrane" refers to a flat sheet porous membrane manufactured by Entegris, Inc. using a single-size Ni powder Vale Inco Type 255.

Figure 6:
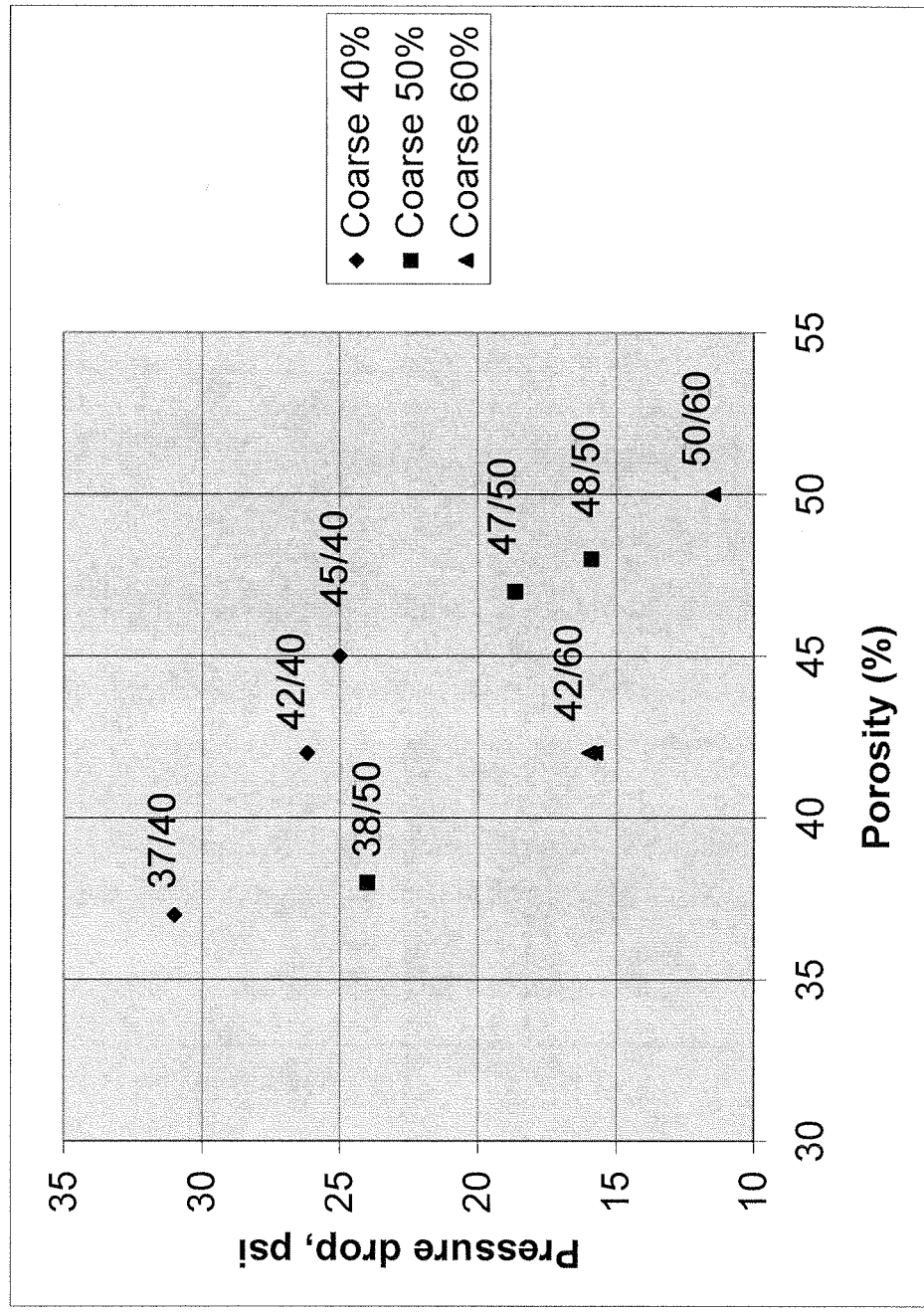
FIG. 6 is a plot of a pressure drop at 100 slpm (T adjusted) as a function of porosity measured for three different porous membranes of the present invention.

The data presented in FIG. 5 shows that the porous membrane with a pressure drop closest to the NF membrane was a material with 60% 50 micron powder, 40% Vale Inco Type 255 and an overall porosity of 42%. These results show that it is possible to reduce pressure drop over the existing membrane based on the composition of the starting blended powder. This conclusion was further confirmed by the measurement of the pressure drop as a function of porosity for three different compositions of the starting powder blends. The results are presented in FIG. 6.

Example 3

Measurements of Particle Reduction and the Log-Reduction Values

Particle reduction and LRV of the membranes of the present invention were measure based on Semi F38-0699 "Test Method for efficiency Qualification of Point of Use Gas Filters", incorporated herein by reference in its entirety. Table 4, below, lists the values of the LRV for selected membranes listed by the "IDs."

TABLE 4

| Disk # | LRV[1] | ID |
|---|---|---|
| 1 | 3.24 | 37/40 |
| 2 | 4.31 | 47/50 |
| 3 | 3.39 | 50/60 |
| 4 | 3.38 | 42/60 |
| 5 | 4.31 | 42/40 |
| 6 | 3.72 | 48/50 |
| 7 | 4.81 | 38/50 |
| 8 | 3.22 | 42/60 |
| 9 | 4.49 | 45/40 |

[1]Measured for particles of 0.1 microns on a 2.54 mm thick disk having the diameter of 4.74 cm, at 40 slpm/cm².

It was previously accepted by those of ordinary skill in the art that the sample with the least porosity and lowest percentage of coarse powder would have the highest LRV. Unexpectedly, it was found that the LRV of the membranes of the present invention was not measurably impacted by porosity and percent of the coarse powder in the starting blend. The results are illustrated by the plot shown in FIG. 7.

Figure 7:
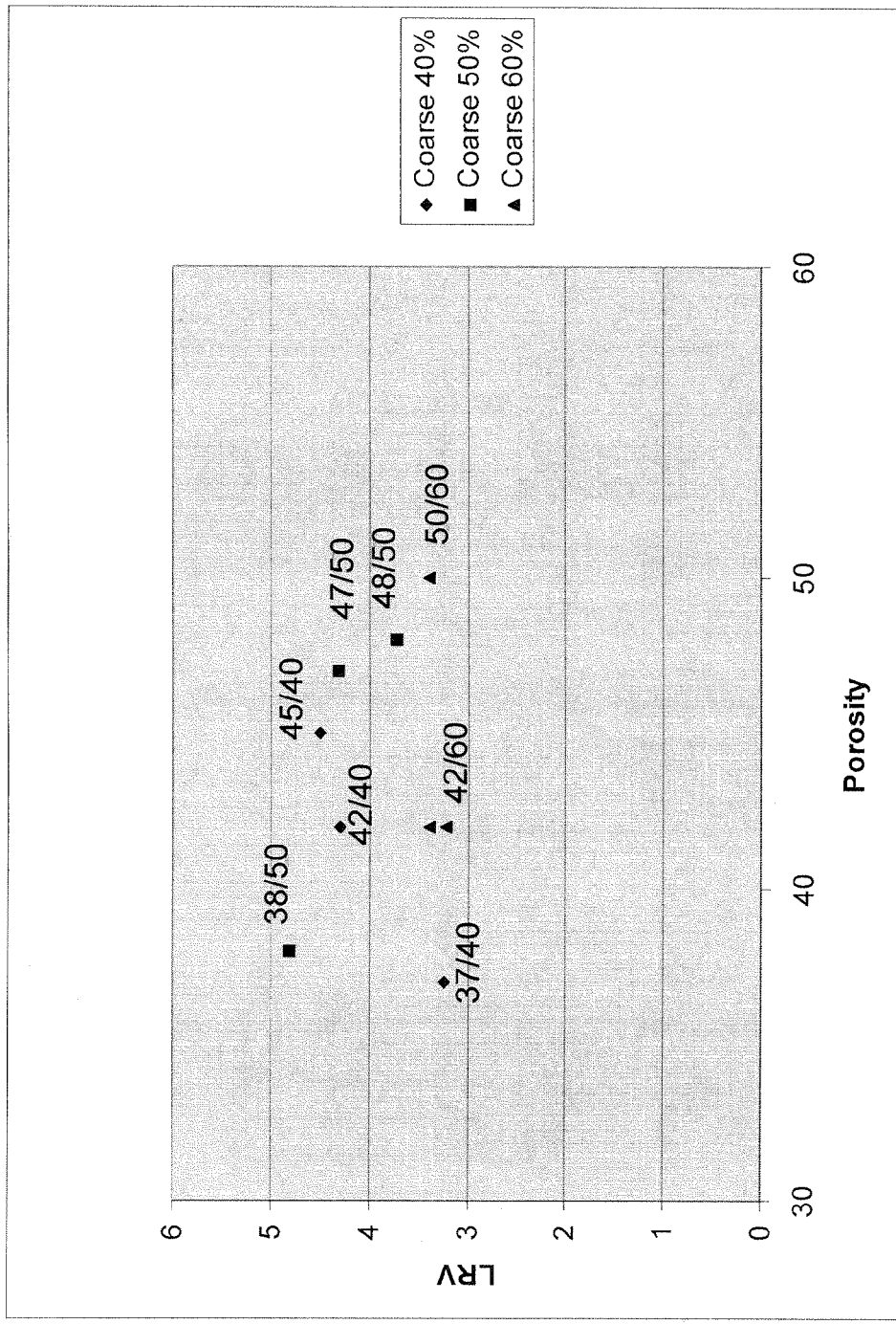
FIG. 7 is a plot of the Log Reduction Values (LRV) as a function of porosity generated for different porous membranes of the present invention.

The results shown in FIG. 7 suggest that an increase of thickness of a membrane optimized for flow performance (by, e.g., adjusting porosity and/or composition of the starting blended powder) will result in higher LRV. For example, for a porous membrane of the present invention manufactured from a starting blend of 60% 50 micron particles and being 50% porous (ID 50/60 in Table 3), a value of 6 LRV may be obtainable with a thickness of 0.4 cm while having a pressure drop of 18 psi for gas velocity of 5 slpm/cm² for a 47 mm disk diameter. This flow is a comparable with that through an existing NF membrane manufactured by Entegris, Inc.

It is noted that the porous materials of the present invention exhibit an LRV value close to 6. Such values are considered high enough to be provide high efficiency filtration (99.9999% efficient). For a material having high LRV, the thickness of the material could be increased, this also increase strength. For example, 0.180 inch thick membrane prepared from a single-size of 2 micron nickel powder Vale Inco Type 255 exhibits mass of per unit area was 0.8 g/cm².

Example 4

Measurements of the Strength

Strength of the porous membranes of the present invention was measured as the gas pressure at which the material will burst when the membrane is configured into disk that is welded at the circumference in the manner of a fixed fiat plate. FV-50 product manufactured by Entegris, Inc. (a porous membrane manufactured from a single-size 50 micron Ni particles) generally ruptures between 75-100 psi for a disk with a diameter of 2.05 inch and a thickness of 0.100 inch. The 42% porous disk with 60% 50 micron powder of the same dimensions could not be ruptured with pressures up to 350 psi.

Examples 5, 6 and 7

All measurements described in Examples 5 through 7 (and illustrated by the plots in FIG. 8 and FIG. 9) were performed using a device shown in FIG. 4. The porous membrane of this device was manufactured from the material of ID 42/60 (as described in Table 3), in the shape of a disk having the thickness of 0.44 cm and the diameter of 5.2 cm.

Example 5

Measurement of Deflection

Two samples of the porous membrane of the present invention (referred to as FV-50DXL #1 and FV-50 DXL #2) were compared to two control samples (refered to as FV-50D #1 and FV-50D #2). "FV-50D" is a product manufactured by Entegris, Inc. (a porous membrane manufactured from 50 micron Ni particles), while FV-50 DXL is a device manufactured from the material ID 42/60, as described above.

Figure 8:
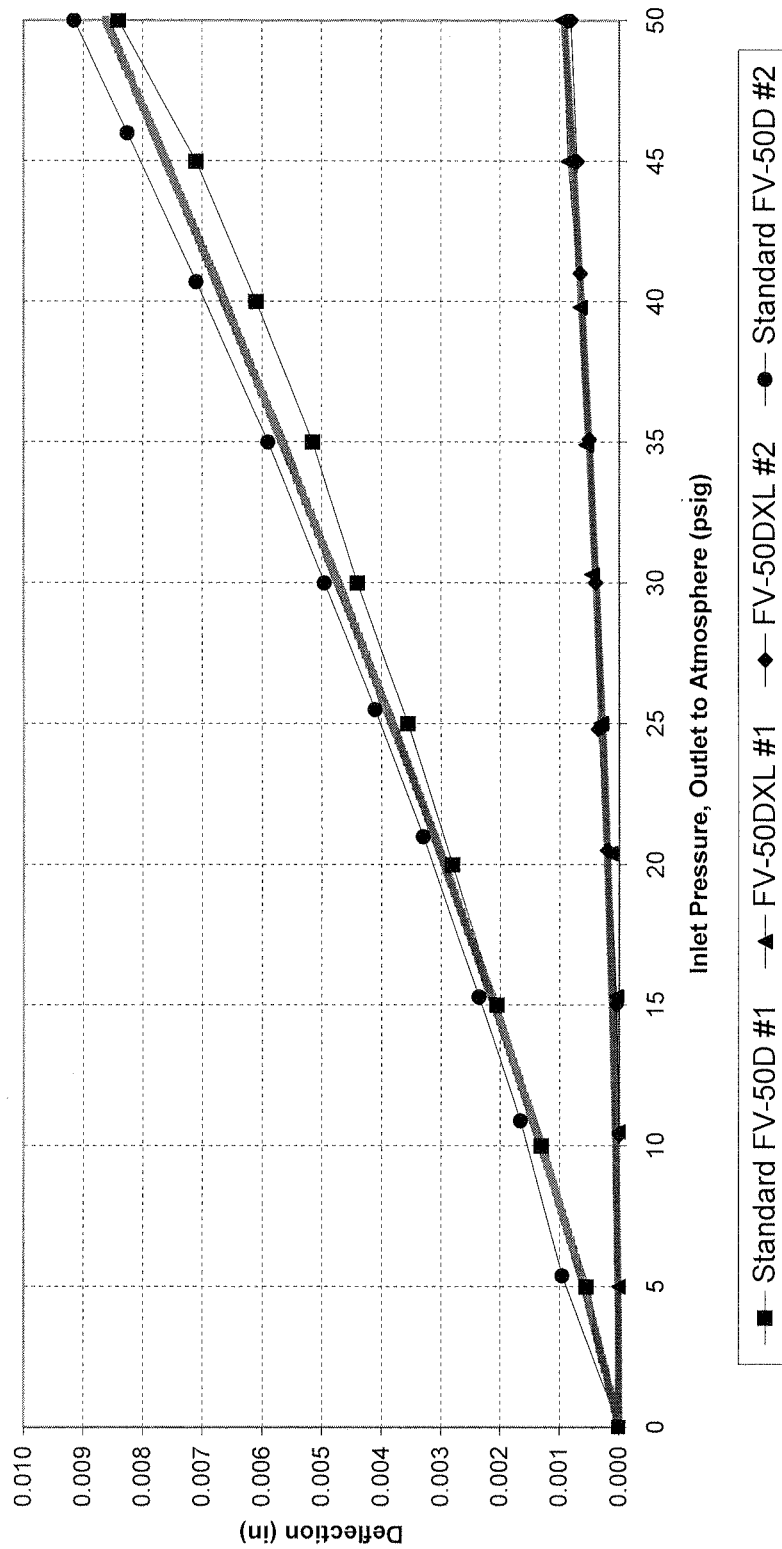
FIG. 8 is a plot of deflection (movement due to pressure) of various membranes of the present invention measured as a function of applied force.

Deflection (movement due to pressure) of the membrane material was measured as a function of applied force. The results are shown in FIG. 8.

The results of the tests show that for disks of the same diameter, the porous membranes of the present invention have a deflection of less than 0.002 inches, even less than 0.001 inches, at an inlet pressure to the disk of 50 pounds per square inch and with outlet pressure at normal atmospheric pressure.

Example 6

Measurements of Bubble Point

Bubble point testing indicates a porous membrane of the present invention has a larger pore size than a porous membrane prepared by sintering a single-size Vale Inco Type 255 powder. The porous membrane manufactured by sintering a single-size Vale Inco Type 255 powder has a bubble point of approximately 10 psi in water, while the tested porous membrane of the present invention has a bubble point at approximately 6 psi.

Example 7

Measurement of Flow Rate as a Function of Differential Pressure

A sample of the porous membrane of the present invention (referred to as FV-50DXL) was compared to a control sample (referred to as FV-50D). "FV-50D" is a product manufactured by Entegris, Inc. (a porous membrane manufactured from 50 micron Ni particles), while FV-50 DXL is a device manufactured from the material ID 42/60, as described above.

Flow rate through the porous membranes of the present invention was measured as a function of differential pressure across the membrane. The results were compared with the porous membranes manufactured from single-size metal powders having various average particle sizes. The experiment was performed as follows. Gas (air) was introduced into the inlet of the device at a know pressure. The outlet pressure was kept constant at atmospheric pressure. The volumetric mass flow rate of this gas was measured with a mass flow meter. This was done at several different inlet pressures. A plot was prepared of the of the volumetric mass flow verses the inlet pressure.

Figure 9:
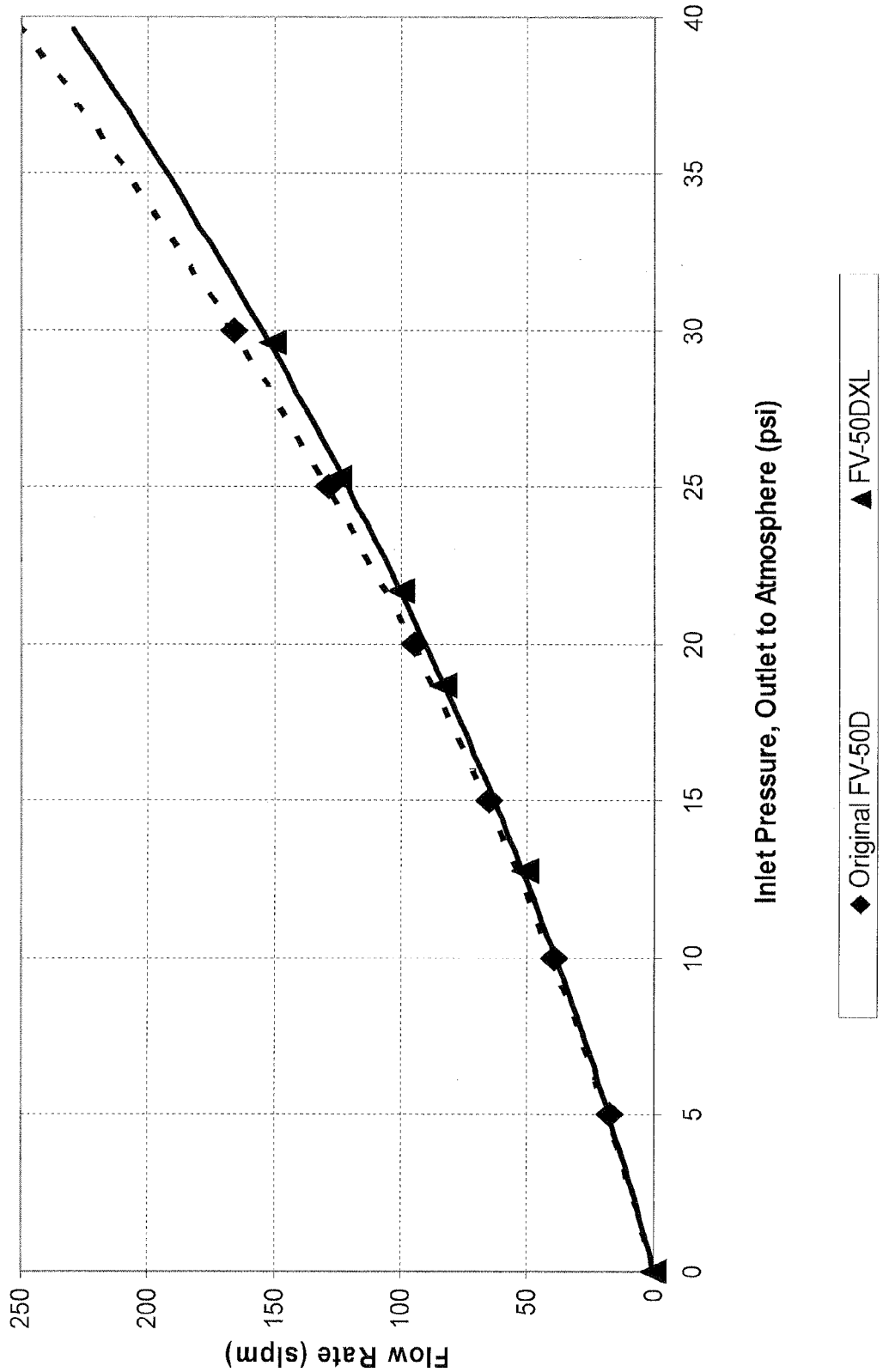
FIG. 9 is a plot of flow rate through various porous membranes of the present invention measured as a function of differential pressure across the membrane (outlet kept at atmospheric pressure).

The results are presented in FIG. 9. As can be seen, flow characteristics of the porous membranes of the present invention show close correlation with the membranes manufactured form single-size powders.

Example 8

Summary of the Properties of Selected Porous Membranes

Provided below in Table 5 is a summary of the properties of one embodiment of the porous membrane of the present invention manufactured by sintering a Vale Inco Type 255 nickel powder (2 micron) and a "coarse" nickel powder having an average particle size of 50 microns. Also provided for comparison are the properties of a porous membrane manufactured by sintered a single-size Vale Inco Type 255 nickel powder.

TABLE 5

|  | Control | Membrane of the invention |
|---|---|---|
| Mass of Vale Inco Type 255 2 μm, g | 14.2 | 14.4 |
| Mass of AMETEK 200 50 μm, g | 0 | 21.6 |
| Total mass, g | 14.2 | 36 |
| Compaction pressure, psi | <1000 | 1000 |
| Thickness, cm | 0.254 | 0.4445 |
| Diameter, cm | 5.0 | 5.0 |
| Porosity, % | 65 | 42 |
| Burst, psi | 110 | >350 |
| Flow/area @ 18 psi-slpm/cm$^2$ | 5 | 5 |
| LRV @ 3 splm/cm$^2$ | 9 | 6 |
| Bubble point-water | 10 | 6 |

While this invention has been particularly shown and described with references to example embodiments thereof, it will be understood by those skilled in the art that various changes in form and details may be made therein without departing from the scope of the invention encompassed by the appended claims.

What is claimed is:

1. A porous membrane, comprising a blend of a first powder of metal particles of a first average size and a second powder of metal particles of a second average size, the first powder and the second powder sintered together,
    wherein the first average size is five to fifty times greater than the second average size, and
    wherein the porous membrane comprises from 40% to 60% by weight of the first powder,
    wherein the water bubble point of the porous membrane is from 4 to 8 psi, and
    wherein the porous membrane has a Log Reduction Value (LRV) of 4 or more for 0.1 micron particles in a gas having velocity of 3 slpm/cm$^2$ measured on a 0.4 centimeter thick membrane,
    wherein the first average size is from about 40 microns to about 60 microns, and the second average size is not greater than about 2 microns.

2. The porous membrane of claim 1, wherein a porosity of the porous membrane is from 37% by volume to 50% by volume.

3. The porous membrane of claim 1, wherein a porosity of the porous membrane is from 42% by volume to 48% by volume.

4. The porous membrane of claim 1, wherein the first average size is about 50 microns, and the second average size is about 2 microns.

5. The porous membrane of claim 1, wherein the metal particles of the first powder and the metal particles of the second powder are each independently selected from nickel or stainless steel.

6. The porous membrane of claim 1, wherein the metal particles of the first powder and the metal particles of the second powder are each selected from nickel.

7. A gas diffuser device comprising:
   a housing having an inlet and an outlet; and
   a porous membrane of claim 1.

8. The device of claim 7, wherein a porosity of the porous membrane is from 37% by volume to 50% by volume.

9. The device of claim 7, wherein a porosity of the porous membrane is from 42% by volume to 48% by volume.

10. The device of claim 7, wherein the first average size is about 50 microns, and the second average size is about 2 microns.

11. The device of claim 7, wherein the metal particles of the first powder and the metal particles of the second powder are each independently selected from nickel or stainless steel.

12. The device of claim 7, wherein the metal particles of the first powder and the metal particles of the second powder are each selected from nickel.

13. The device of claim 7, wherein the porous membrane is a flat sheet having a thickness of 0.1 inch or more.

14. The device of claim 7, wherein the porous membrane is a flat sheet having a thickness from 0.2 cm to 0.5 cm, and further wherein the Log Reduction Value of the porous membrane is at least 6 in a gas for 0.1 micron particles and velocity of 3 slpm/cm$^2$.

15. The device of claim 14, wherein the porous membrane has a burst pressure of at least 300 pounds per square inch.

16. The device of claim 14, wherein the porous membrane has a burst pressure of greater than 350 pounds per square inch.

17. A method of purifying a gas stream, comprising:
   directing a gas stream through a porous membrane of claim 1,
   thereby purifying the gas stream.

18. The method of claim 17, wherein a porosity of the porous membrane is from 37% by volume to 50% by volume.

19. The method of claim 17, wherein a porosity of the porous membrane is from 42% by volume to 48% by volume.

20. The method of claim 17, wherein the first average size is about 50 microns, and the second average size is about 2 microns.

21. The method of claim 17, wherein the metal particles of the first powder and the metal particles of the second powder are each independently selected from nickel or stainless steel.

22. The method of claim 17, wherein the metal particles of the first powder and the metal particles of the second powder are each selected from nickel.

23. The method of claim 17, wherein the porous membrane is a flat sheet having a thickness of 0.1 inch or more.

24. The method of claim 17, wherein the porous membrane is a flat sheet having a thickness from 0.2 cm to 0.5 cm, and further wherein the Log Reduction Value of the porous membrane is at least 6 in a gas for 0.1 micron particles and velocity of 3 slpm/cm$^2$.

25. The method of claim 24, wherein the porous membrane has a burst pressure of at least 300 pounds per square inch.

26. The method of claim 24, wherein the porous membrane has a burst pressure of greater than 350 pounds per square inch.

27. A gas diffuser device comprising:
   a housing having an inlet and an outlet; and
   a porous membrane of claim 1 disposed within the housing in fluid communication with the inlet and the outlet,
   wherein the porous membrane is a flat sheet having a thickness from 0.2 cm to 0.5 cm, having Log Reduction Value of at least 6 in a gas for 0.1 micron particles and velocity of 3 slpm/cm$^2$, and a burst pressure of at least 300 pounds per square inch

\* \* \* \* \*